US012762369B2

(12) United States Patent
Tomiyama et al.

(10) Patent No.: US 12,762,369 B2
(45) Date of Patent: Oct. 13, 2026

(54) WIRELESS TAG COMMUNICATION SYSTEM

(71) Applicant: Toshiba Tec Kabushiki Kaisha, Tokyo (JP)

(72) Inventors: Takashi Tomiyama, Sunto Shizuoka (JP); Kentaro Yoshida, Numazu Shizuoka (JP); Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/011,049

(22) Filed: Jan. 6, 2025

(65) Prior Publication Data

US 2025/0232146 A1 Jul. 17, 2025

(30) Foreign Application Priority Data

Jan. 12, 2024 (JP) ................................ 2024-003165

(51) Int. Cl.
*G06K 17/00* (2006.01)
*B41J 3/50* (2006.01)
*G06K 19/07* (2006.01)

(52) U.S. Cl.
CPC ............ *G06K 17/0029* (2013.01); *B41J 3/50* (2013.01); *G06K 19/0723* (2013.01)

(58) Field of Classification Search
CPC .... G06K 17/0029; G06K 19/0723; B41J 3/50
USPC .......................................................... 235/375
See application file for complete search history.

(56) References Cited

U.S. PATENT DOCUMENTS

| | | | | |
|---|---|---|---|---|
| 10,725,409 | B1 * | 7/2020 | Sato | G03G 15/607 |
| 11,741,321 | B2 * | 8/2023 | Kawasaki | H04N 1/00342 235/472.02 |
| 2007/0133039 | A1 * | 6/2007 | Yamada | H04N 1/32635 358/1.14 |
| 2019/0232683 | A1 | 8/2019 | Koike et al. | |
| 2021/0229950 | A1 | 7/2021 | Ishikawa et al. | |
| 2022/0021771 | A1 * | 1/2022 | Koike | H01Q 1/2208 |

FOREIGN PATENT DOCUMENTS

JP 2006293461 A 10/2006

OTHER PUBLICATIONS

Extended European Search Report mailed Aug. 20, 2025 in corresponding European Patent Application No. 25163179.2, 9 pages.
Notice of Reasons for Refusal (First Office Action) dated Jul. 14, 2026, mailed in Japanese Patent Application No. 2024-003165, with English machine translation, 7 pages.

* cited by examiner

*Primary Examiner* — Ahshik Kim
(74) *Attorney, Agent, or Firm* — Kim & Stewart LLP

(57) ABSTRACT

According to an embodiment, a wireless tag communication system includes a processing apparatus, a tag communication device, and a controller. The processing apparatus includes a conveyance device that conveys a sheet provided with a wireless tag. The tag communication device performs detection processing of the wireless tag of the sheet conveyed and writing processing of information on the wireless tag. The controller causes the tag communication device to execute the writing processing after the conveyance device has started to convey the sheet and a predetermined waiting time has elapsed.

13 Claims, 13 Drawing Sheets

| Sheet feed cassette | Path length [in mm] | Conveyance speed [in mm/seconds] | Tag proximity waiting time [in seconds] |
|---|---|---|---|
| 161 | 100 | 200 | 0.50 |
| 162 | 200 | 200 | 1.00 |
| 163 | 300 | 200 | 1.50 |
| 164 | 400 | 200 | 2.00 |

Fig.7

| Sheet feed cassette | Tag redetection waiting time [in seconds] |
|---|---|
| 161 | 0.00 |
| 162 | 0.25 |
| 163 | 0.25 |
| 164 | 0.25 |

Fig.11

| Sheet feed cassette | Number of tag detection times |
|---|---|
| 161 | 0 |
| 162 | 5 |
| 163 | 5 |
| 164 | 5 |

Fig.13

WIRELESS TAG COMMUNICATION SYSTEM

CROSS-REFERENCE TO RELATED APPLICATIONS

This application is based upon and claims the benefit of priority from the prior Japanese Patent Application No. 2024-3165, filed on Jan. 12, 2024, the entire contents of which are incorporated herein by reference.

FIELD

An embodiment described here generally relates to a wireless tag communication system.

BACKGROUND

There is an image forming apparatus is capable of forming an image on a sheet provided with a wireless tag. Such an image forming apparatus includes a wireless tag communication apparatus that communicates with the wireless tag. The wireless tag communication apparatus writes information in the wireless tag during the sheet conveyance. At this time, the wireless tag communication apparatus needs to prevent erroneously writing information on a wireless tag that is not a writing target. TO prevent such erroneous writing, a conventional wireless tag communication apparatus sets for example electric power to emit a radio wave carrying a detection signal for detecting a wireless tag to be relatively small. Then, the wireless tag communication apparatus measures a received signal strength indicator (RSSI) of a radio wave (reflection wave) carrying a response signal sent back from a wireless tag that has received the radio wave. The wireless tag communication apparatus performs writing processing of information on the wireless tag in a case where the RSSI value exceeds a predetermined threshold. The threshold is preset to be a value that enables for example a wireless tag provided in the sheet being conveyed to be distinguished from a wireless tag included in a sheet placed in a sheet feed cassette (i.e., sheet before it starts to be conveyed).

However, an area where the communication between the wireless tag communication apparatus and the wireless tag is blocked (hereinafter, referred to as "no communication area") is sometimes generated on a sheet conveyance path in the image forming apparatus. For example, where a deviation between a direction in which the wireless tag communication apparatus emits a radio wave and a direction of an antenna of a wireless tag being conveyed increases is likely to be the no communication area. Moreover, the no communication area is easily generated also in a case where there is an area where the radio wave is blocked by members densely arranged in the image forming apparatus. Therefore, when the sheet being conveyed is located in the no communication area, the communication between the wireless tag and the wireless tag communication apparatus is not performed and the information writing on the wireless tag fails in some cases.

BRIEF DESCRIPTION OF THE DRAWINGS

FIG. 7 is a diagram showing an example of a tag proximity waiting time set in the image forming system according to the first embodiment.

FIG. 11 is a diagram showing an example of a tag redetection waiting time set by the image forming system according to the second embodiment.

FIG. 13 is a diagram showing an example of the number of tag detection times set in an image forming system according to the third embodiment.

DETAILED DESCRIPTION

In accordance with one embodiment, a wireless tag communication system includes a processing apparatus, a tag communication device, and a controller. The processing apparatus includes a conveyance device that conveys a sheet provided with a wireless tag. The tag communication device performs detection processing of the wireless tag of the sheet conveyed by the conveyance device of the processing apparatus and writing processing of information on the wireless tag. The controller causes the tag communication device to execute the writing processing after the conveyance device has started to convey the sheet and a predetermined waiting time has elapsed.

Hereinafter, a wireless tag communication system according to an embodiment will be described with reference to the drawings. It should be noted that in the following description, configurations with the same or similar functions will be denoted by the same reference signs. Moreover, duplicate descriptions may be omitted.

Hereinafter, a first embodiment will be described.

Figure 1:
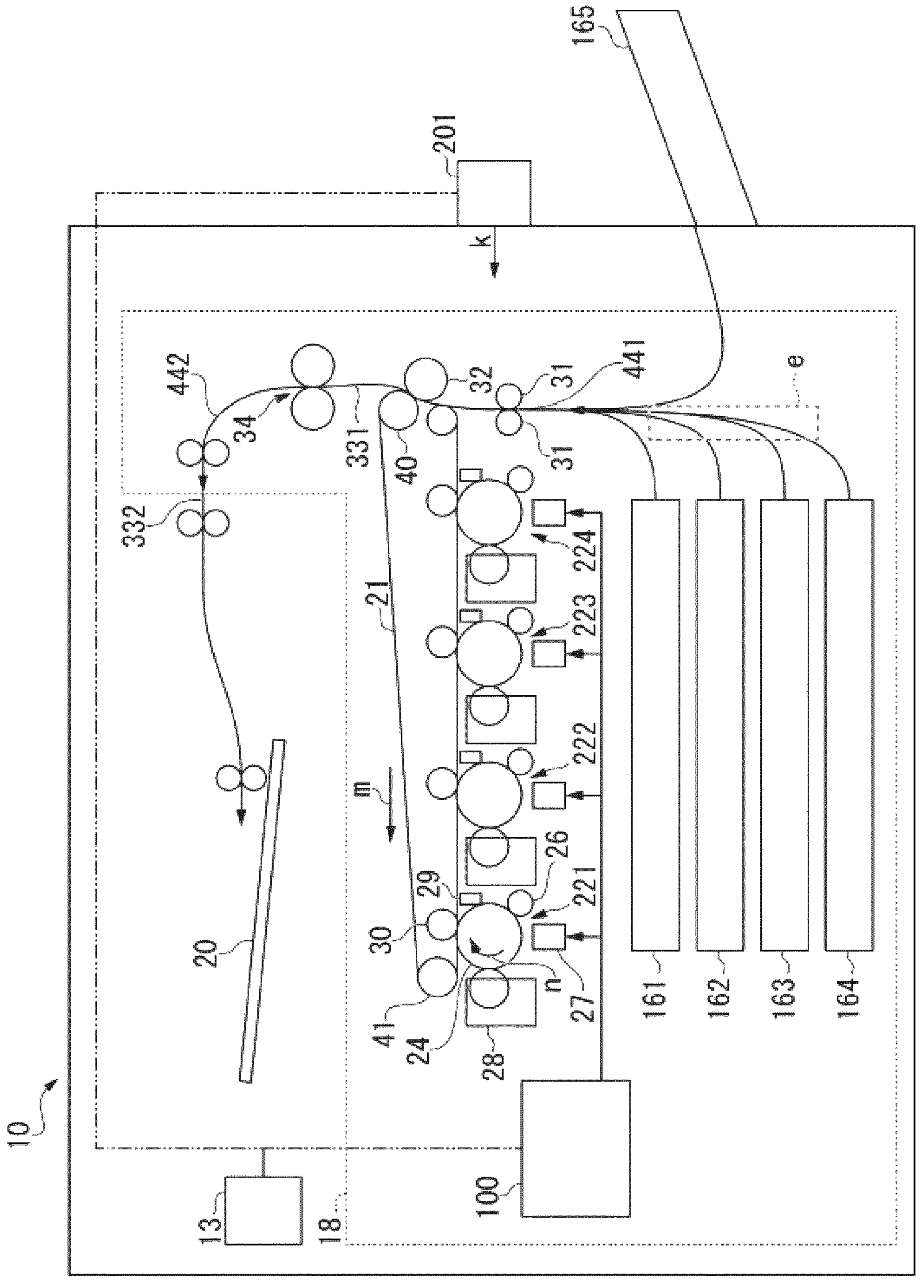
FIG. 1 is a side view of an image forming system according to a first embodiment.

FIG. 1 is a side view of an image forming system according to the first embodiment. The image forming system is an example of a wireless tag communication system according to the present embodiment. The image forming system is a system that forms an image on a surface of a sheet and writes information in a wireless tag provided in the sheet. The image forming system is used, installed in a work place. As shown in FIG. 1, the image forming system includes an image forming apparatus 10 and a wireless tag communication apparatus 201.

The image forming apparatus 10 is an example of a processing apparatus according to the present embodiment. The image forming apparatus 10 is an apparatus that forms an image on a surface of a sheet to be conveyed, such as a multifunction peripheral (MFP) or printer. The image forming apparatus 10 includes a control panel 13, a printer part 18, and a sheet delivery tray 20, for example. The printer part 18 includes a controller 100 and sheet feed cassettes 161 to 164, for example. The controller 100 controls operations of the control panel 13, the printer part 18, and the like. Moreover, the controller 100 controls the sheet conveyance in the printer part 18. The control on the sheet conveyance refers to controlling a conveyance timing of the sheet, a stop position of the sheet, a conveyance speed of the sheet, and the like.

The control panel 13 includes input unit and display unit (not shown). The input unit is for example an input button that receives an input operation from a user. The display unit is for example a display that displays various types of information that the user refers to. It should be noted that the input unit and display unit may be an integrated apparatus for example a touch panel-type display. The control panel 13 causes the display unit to display for example a setting item regarding the operation of the image forming apparatus 10. Moreover, the control panel 13 outputs to the controller 100 for example information indicating the setting contents selected by the user.

The sheet feed cassettes 161 to 164 store sheets with wireless tags. It should be noted that the sheet feed cassette 161 to 164 are capable of storing even sheets with no wireless tags as a matter of course. It should be noted that in the following description, the "sheet" refers to a sheet provided with a wireless tag. In general, a material such as paper or a plastic film is used for the sheet. It should be noted that any material may be used for the sheet as long as an image can be formed on its surface.

The printer part 18 performs image forming processing. The printer part 18 forms an image based on input image data on the surface of the sheet. The printer part 18 includes an intermediate transfer belt 21. The intermediate transfer belt 21 is supported by rollers such as a following roller 41 and a back-up roller 40. The printer part 18 rotates the rollers, thereby rotating the intermediate transfer belt 21 in the arrow m direction in FIG. 1.

The printer part 18 includes four image forming stations 221 to 224. The image forming stations 221, 222, 223 and 224 are used for image forming of Y (yellow), M (magenta), C (cyan), and K (black), respectively. The image forming stations 221 to 224 are arranged side by side below and along the intermediate transfer belt 21. It should be noted that in a case where the image forming apparatus forms only black and white images, only the image forming station 224 that forms images in K (black) needs to be provided.

Hereinafter, a configuration of the image forming station 221 for Y (yellow) among the image forming stations 221 to 224 will be described as an example. It should be noted that configurations of the image forming station 222 to 224 are similar to the configuration of the image forming station 221, so detailed descriptions thereof will be omitted.

The image forming station 221 includes an electrostatic charger 26, an exposure scan head 27, a developer 28, and a photosensitive cleaner 29. The electrostatic charger 26, the exposure scan head 27, the developer 28 and the photosensitive cleaner 29 are arranged around a photosensitive drum 24. The photosensitive drum 24 rotates in a direction of the arrow n in FIG. 1.

The image forming station 221 includes a primary transfer roller 30. The primary transfer roller 30 faces the photosensitive drum 24 via the intermediate transfer belt 21.

The image forming station 221 charges the photosensitive drum 24 with static electricity through the electrostatic charger 26 and then exposes it to light through the exposure scan head 27. The image forming station 221 forms an electrostatic latent image on the photosensitive drum 24. The developer 28 develops the electrostatic latent image on the photosensitive drum 24 by using a two-component developer which is formed by toner and carrier.

The primary transfer roller 30 primarily transfers a toner image formed on the photosensitive drum 24 onto the intermediate transfer belt 21. The image forming stations 221 to 224 form color toner images on the intermediate transfer belt 21 through the primary transfer roller 30. The color toner images are formed by sequentially overlapping toner images of Y (yellow), M (magenta), C (cyan), and K (black). The photosensitive cleaner 29 removes residual toner after it is primarily transferred to the photosensitive drum 24.

The printer part 18 includes a secondary transfer roller 32. The secondary transfer roller 32 faces the back-up roller 40 via the intermediate transfer belt 21. The secondary transfer roller 32 secondarily transfers the color toner images on the intermediate transfer belt 21 onto the sheet at once. It should be noted that the "toner image" set forth herein may be either the color toner images or a one-color toner image. Moreover, the toner image may be a toner image with decolorable toner.

The sheet is conveyed along a conveyance path 331 and a conveyance path 332. The conveyance path 331 is a conveyance path of a section from a merging part 441 to a branching part 442. The conveyance path 331 is an example of a conveyance device. The conveyance path 332 is a conveyance path of a section from the branching part 442 to the sheet delivery tray 20.

A front end of a sheet taken out from one of the sheet feed cassettes 161 to 164 or a manual feed tray 165 is brought into contact with a portion where two stopped resist rollers 31 are held in contact with each other. The tilt of the sheet in contact with the resist rollers 31 is corrected. The controller 100 starts to rotate the resist rollers 31 in accordance with a position of the toner image on the rotating intermediate transfer belt 21 so that the sheet moves to a position of the secondary transfer roller 32. The controller 100 secondarily transfers the toner image formed on the intermediate transfer belt 21 onto the sheet through the secondary transfer roller 32. The controller 100 conveys the sheet to the conveyance path 331 and fixes the toner image on the sheet through a fixing apparatus 34, thereby forming an image. The controller 100 conveys the sheet on which the image is formed to the conveyance path 332, thereby delivering the sheet.

The wireless tag communication apparatus 201 is for example a radio frequency identification (RFID) reader/writer. The wireless tag communication apparatus 201 includes a processor 218 and a storage device 219 to be described later. The wireless tag communication apparatus 201 is capable of communicating with the controller 100. The wireless tag communication apparatus 201 communicates with the wireless tag provided in the sheet so as to read information from the wireless tag and write information in the wireless tag. The wireless tag is for example an RFID tag.

The wireless tag communication apparatus 201 executes processing of writing information on the wireless tag (hereinafter, referred to as "tag writing processing") before the printer part 18 forms an image on the sheet. It should be noted that the wireless tag communication apparatus 201 may be configured to execute the tag writing processing after the printer part 18 forms an image on the sheet. The wireless tag communication apparatus 201 measures an RSSI of the radio wave (reflection wave) carrying a response signal emitted from the wireless tag. The wireless tag communication apparatus 201 determines whether or not it is possible to the tag writing processing in accordance with the measured RSSI value. The wireless tag communication 201 executes tag apparatus writing processing for example in a case where the measured RSSI value is equal to or higher than a predetermined threshold. The wireless tag communication apparatus 201 starts to execute the tag writing processing at a timing based on a predetermined condition in a case of executing the tag writing processing. It should be noted that the will be tag writing processing described later in detail.

Hereinafter, a functional configuration of the image forming apparatus 10 will be described.

Figure 2:
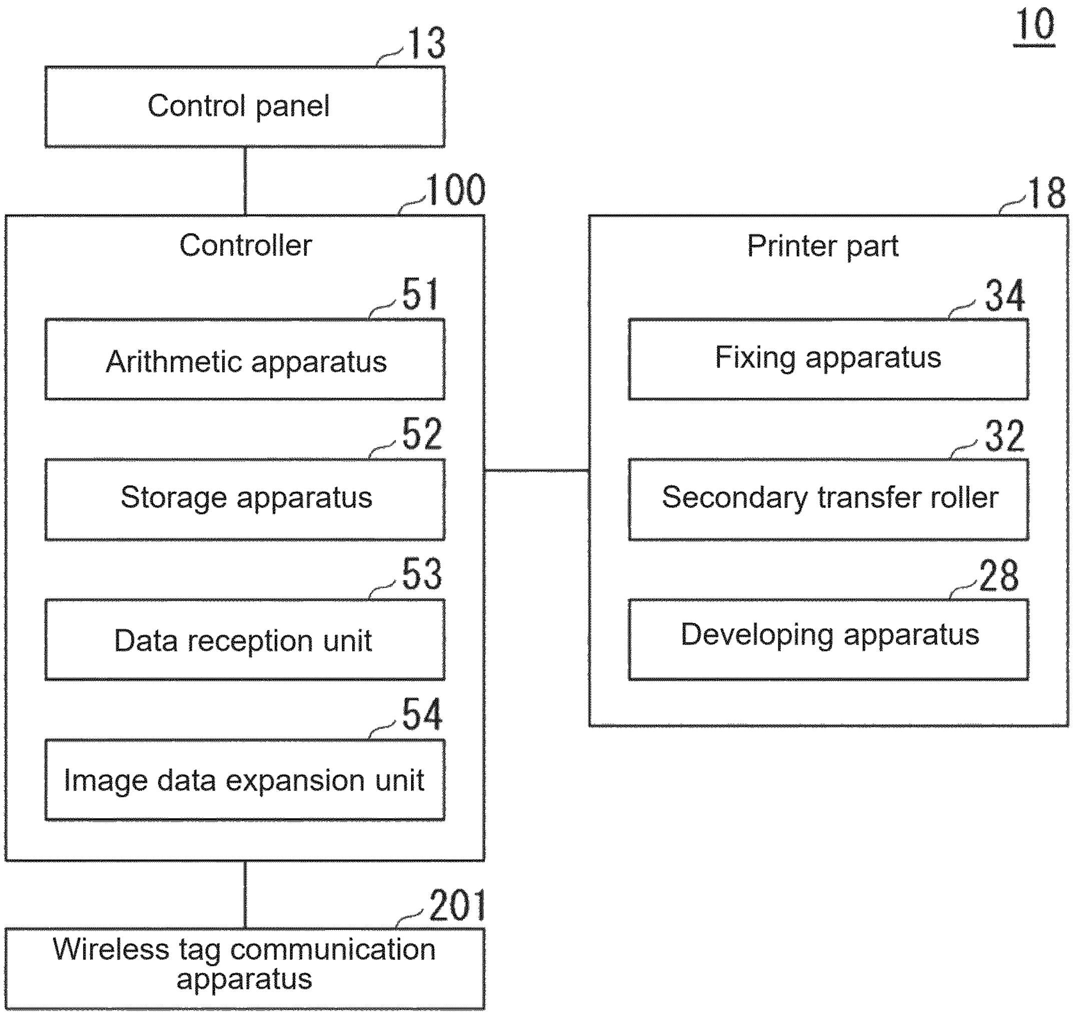
FIG. 2 is a block diagram showing a functional configuration of an image forming apparatus according to the first embodiment.

FIG. 2 is a block diagram showing the functional configuration of the image forming apparatus 10 according to the first embodiment. As shown in FIG. 2, the image forming apparatus 10 includes the controller 100, the control panel 13, the printer part 18, and the wireless tag communication apparatus 201.

The controller 100 includes an arithmetic apparatus 51 and a storage device 52. The arithmetic apparatus 51 controls the control panel 13, the printer part 18, and the wireless tag communication apparatus 201 in accordance with an image processing program stored in the storage device 52. The controller 100 sends for example information for instructing to execute the tag writing processing (hereinafter, referred to as "tag writing command") to the wireless tag communication apparatus 201.

The arithmetic apparatus 51 is for example a processor such as a central processing unit (CPU) or an application specific integrated circuit (ASIC). The storage device 52 is for example a storage medium such as a read only memory (ROM), a random access memory (RAM), a hard disk drive (HDD), a solid state drive (SSD), or a combination of these storage media.

A data reception unit 53 receives from a host computer such as a personal computer (PC) image data indicating an image to be formed on the sheet. The image data is for example data described in a page description language. The data reception unit 53 causes the storage device 52 to store the received image data.

An image data expansion unit 54 determines an image forming condition on the basis of the image data stored in the storage device 52. The image data expansion unit 54 expands, on the basis of the determined image forming condition, the image data for example into data (hereinafter, referred to as "image forming data") that can be formed by the printer part 18, such as raster data. The image data expansion unit 54 causes the storage device 52 to store the expanded image forming data.

The printer part 18 includes the fixing apparatus 34, the secondary transfer roller 32, and the developer 28. The printer part 18 forms an image on the sheet on the basis of the image forming data stored in the storage device 52 by the image data expansion unit 54.

Figure 3:
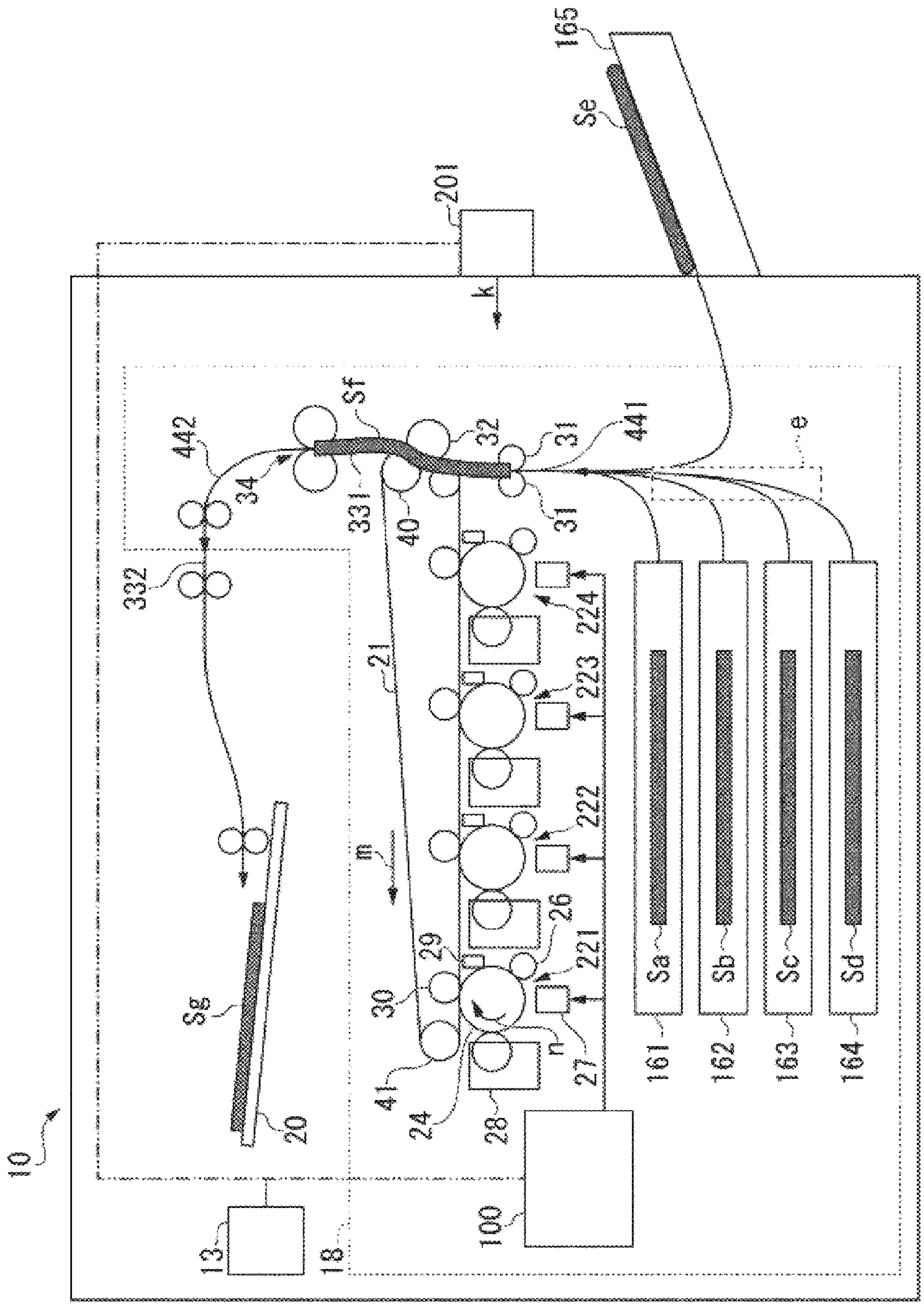
FIG. 3 is a diagram showing an example of a position where a sheet can be present in the image forming apparatus according to the first embodiment.

FIG. 3 is a diagram showing an example of the position where the sheet can be present in the image forming apparatus 10 according to the first embodiment. Sheets Sa to Sd shown in FIG. 3 are sheets in a state of being respectively placed on the sheet feed cassette 161 to 164. The sheet Se is a sheet in a state of being placed in the manual feed tray 165. That is, the sheets Sa to Se are sheets before they are conveyed. The sheet Sf is a sheet being conveyed on the conveyance path 331. The sheet Sg is a sheet placed on the sheet delivery tray 20. That is, the sheet Sg is a sheet after it is conveyed.

As described above, the sheet is provided with the wireless tag. Moreover, the sheet that is a target of the tag writing processing is a sheet being conveyed on the conveyance path 331.

The wireless tag communication apparatus 201 emits a radio wave (carrier wave) carrying a detection signal for detecting a wireless tag in a direction of the arrow k in FIG. 3. Electric power is generated in the antenna of the wireless tag that has received the radio wave. The wireless tag operates by the electric power and emits a radio wave (reflection wave) carrying the response signal. The wireless tag communication apparatus 201 receives a radio wave carrying the response signal. At this time, the RSSI of the radio wave carrying the response signal differs depending on a position relationship between the wireless tag communication apparatus 201 and the wireless tag, the radio wave directivity, and the like. Since the sheet that is the target of the tag writing processing is being conveyed, the RSSI value of the radio wave received by the wireless tag communication apparatus 201 changes over time.

As shown in FIG. 3, a no communication area e exists in the conveyance path 331. The no communication area e refers to an area where the communication between the wireless tag communication apparatus 201 and the wireless tag cannot be performed when the wireless tag is located in the no communication area e. In the no communication area e, a deviation between the direction in which the wireless tag communication apparatus emits the radio wave and the direction of the antenna of the wireless tag being conveyed increases, so the RSSI value significantly decreases. Accordingly, the communication between the wireless tag communication apparatus 201 and the wireless tag may be difficult, and the tag writing processing may fail. It should be noted that the no communication area e may also be generated by the members densely arranged inside the image forming apparatus 10 blocking radio waves.

It should be noted that in a case of the image forming apparatus 10 shown in the example illustrated in FIG. 3, the sheets Sa, Se respectively conveyed from the sheet feed cassette 161 and the manual feed tray 165 do not pass through the no communication area e. Therefore, in this case, the situation where the communication between the wireless tag communication apparatus 201 and the wireless tag is difficult does not occur.

The image forming apparatus 10 sends the tag writing command to the wireless tag communication apparatus 201 when the sheet conveyance is started. Then, since the sheet is conveyed, the tag writing processing has to be performed after the sheet passes through the no communication area e in a case of the sheets Sb to Sd respectively conveyed from the sheet feed cassettes 162 to 164. Therefore, in the image forming system according to the first embodiment, the controller 100 of the image forming apparatus 10 has a configuration to send a tag writing command to the wireless tag communication apparatus 201 after the sheet conveyance has been started and a predetermined waiting time has elapsed.

Figure 4:
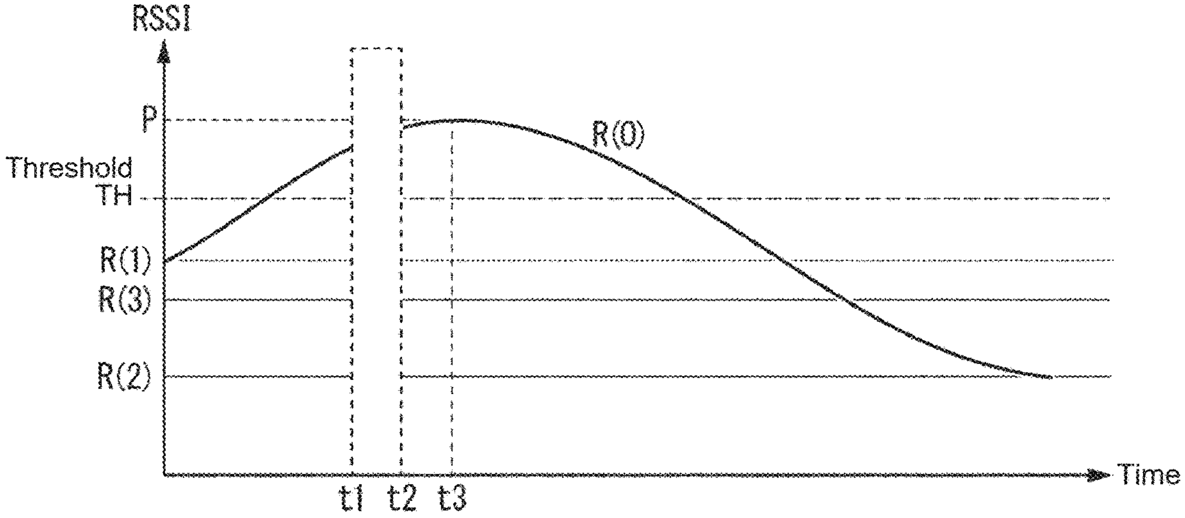
FIG. 4 is a diagram showing an example of a time-sequential variation of an RSSI of radio wave carrying a response signal according to the first embodiment.

FIG. 4 is a diagram showing an example of a time-sequential variation of the RSSI of the radio wave (reflection wave) carrying the response signal according to the first embodiment. The vertical axis of a graph shown in FIG. 4 represents the RSSI value and the horizontal axis represents the time. In FIG. 4, a time zone from an original point of time to a point of time t3 is a time zone in which the wireless tag provided in the sheet is approaching the wireless tag communication apparatus 201. In FIG. 4, a time zone after the point of time t3 is a time zone in which the wireless tag is moving away from the wireless tag communication apparatus 201. Therefore, the RSSI value of the radio wave carrying the response signal becomes maximum at a point of time that is the point of time t3. Moreover, a time zone from a point of time t1 to a point of time t2 is a time zone in which the wireless tag being conveyed passes through the no communication area e. Therefore, in the time zone from the point of time t1 to the point of time t2, the RSSI of the radio wave carrying the response signal significantly lowers.

Hereinafter, a configuration of the wireless tag communication apparatus 201 will be described.

Figure 5:
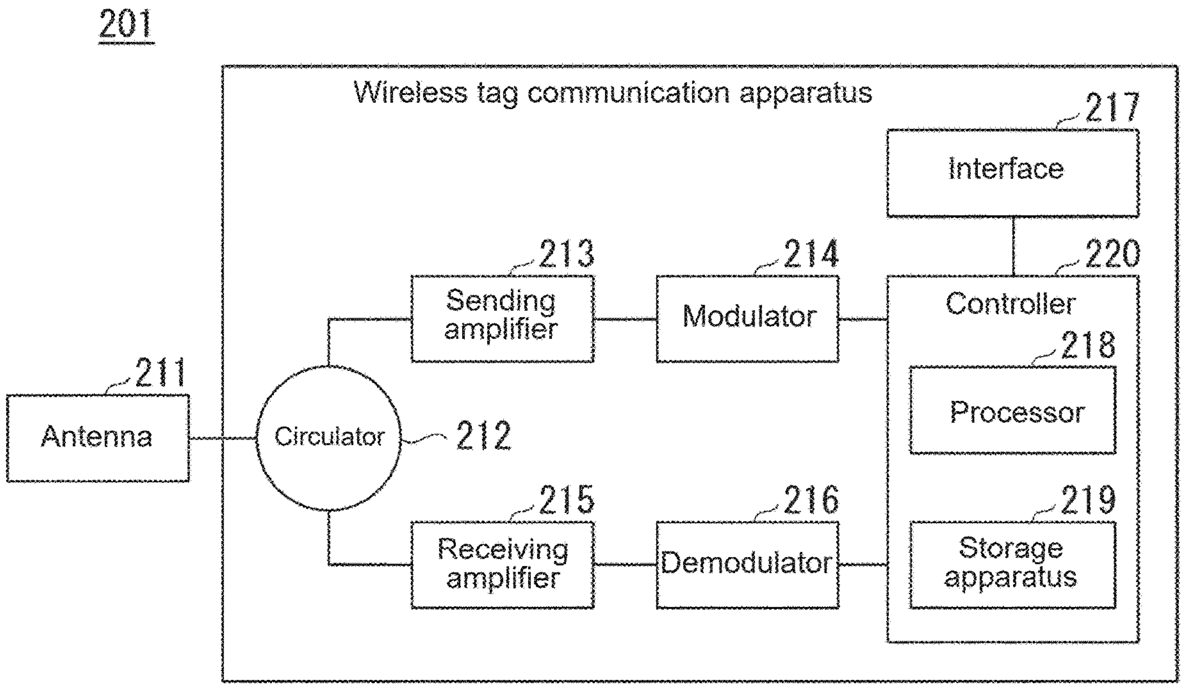
FIG. 5 is a diagram showing an example of a configuration of a wireless tag communication apparatus according to the first embodiment.

FIG. 5 is a diagram showing an example of the configuration of the wireless tag communication apparatus 201 according to the first embodiment. As shown in FIG. 5, the wireless tag communication apparatus 201 includes an antenna 211, a circulator 212, a sending amplifier 213, a modulator 214, a receiving amplifier 215, a demodulator 216, and an interface 217.

The antenna 211 emits for example a radio wave carrying a detection signal for detecting a wireless tag. The antenna 211 emits a radio wave carrying a signal for writing information on the wireless tag (hereinafter, referred to as "tag writing signal"). Moreover, the antenna 211 receives the radio wave (reflection wave) carrying a response signal emitted from the wireless tag. The antenna 211 is an example of a tag communication device.

A controller 220 includes the processor 218 such as a central processing unit (CPU) and the storage device 219. The controller 220 operates by the processor 218 reading out a program stored in the storage device 219 and executing the read-out program. The controller 220 controls the operations of the function parts included in the wireless tag communication apparatus 201.

The controller 220 executes the tag writing processing by controlling the operations of the function parts included in the wireless tag communication apparatus 201. The controller 220 receives the tag writing command sent from the image forming apparatus 10. When the controller 220 receives the tag writing command, the controller 220 emits a radio wave carrying a detection signal for detecting a wireless tag. The controller 220 executes the tag writing processing for example in a case where the RSSI value of the radio wave (reflection wave) carrying a response signal emitted from the wireless tag has exceeded a threshold TH in FIG. 4. The threshold TH is prestored in the storage device 219.

The modulator 214 superimposes (modulates) a detection signal for the wireless tag communication apparatus 201 to detect a wireless tag on the carrier wave. The modulated radio wave is radiated from the antenna 211. The sending amplifier 213 amplifies the intensity of a signal sent by the wireless tag communication apparatus 201. The circulator 212 splits the radio wave emitted by the antenna 211 and the radio wave (reflection wave) received by the antenna 211. The receiving amplifier 215 amplifies the intensity of the signal received by the antenna 211 to be predetermined intensity. The demodulator 216 demodulates the signal received by the antenna 211.

The interface 217 is an interface that connects the wireless tag communication apparatus 201 and the image forming apparatus 10 so that they communicate with each other. The interface 217 receives the tag writing command sent from the image forming apparatus 10 under the control of the controller 220. Moreover, the interface 217 sends information indicating that the information writing on the wireless tag is completed (hereinafter, referred to as a "tag writing completion notice") to the image forming apparatus 10 under the control of the controller 220.

Hereinafter, an operation of the image forming system according to the first embodiment will be described.

Figure 6:
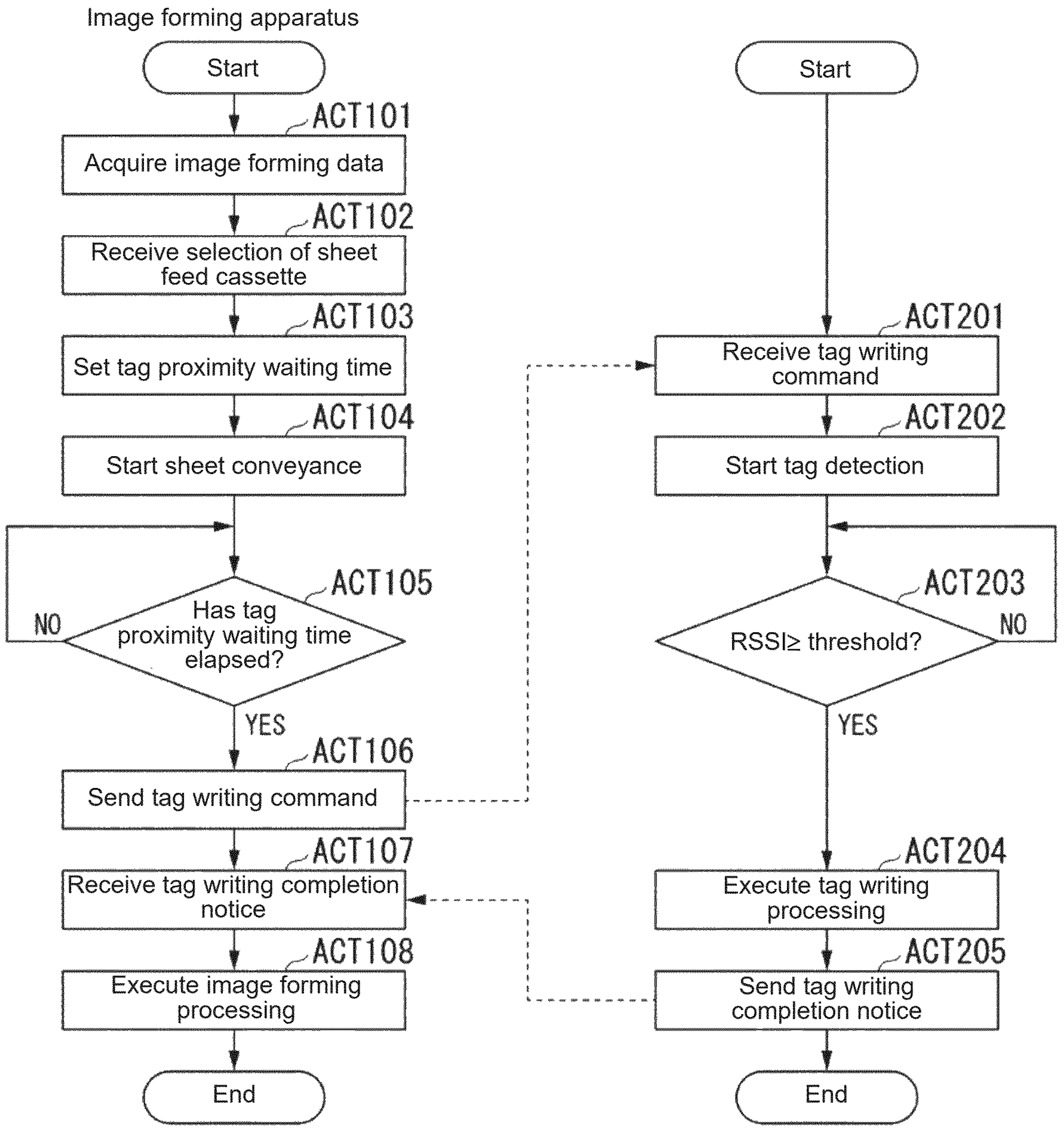
FIG. 6 is a flowchart showing an example of an operation of the image forming system according to the first embodiment.

FIG. 6 is a flowchart showing an example of the operation of the image forming system according to the first embodiment. First of all, the printer part 18 of the image forming apparatus 10 acquires image forming data stored in the storage device 52 (ACT 101). As described above, the image forming data refers to data that can be formed as an image by the printer part 18, such as raster data.

Next, the control panel 13 receives an input operation from the user to select one of the sheet feed cassettes to be used and outputs to the controller 100 information indicating the selected sheet feed cassette (ACT 102). The controller 100 acquires the information indicating the selected sheet feed cassette.

Next, the controller 100 sets the tag proximity waiting time on the basis of the selected sheet feed cassette (ACT 103). The "tag proximity waiting time" refers to a predetermined waiting time set between the start of conveyance of a sheet from the selected sheet feed cassette to sending of a tag writing command to the wireless tag communication apparatus 201. Setting the tag proximity waiting time allows the tag writing processing to be executed after the sheet to be conveyed passes through the no communication area e.

For example, the tag proximity waiting time is preset so that the tag writing processing is executed at a position where the front end of the sheet that has passed through the no communication area e is brought into contact with the resist rollers 31. It is because the wireless tag communication apparatus 201 is installed in the vicinity of the resist rollers 31 and the sheet conveyance is temporarily stopped at the point of time the front end of the sheet is brought into contact with the resist rollers 31, which increases the success rate of the tag writing processing.

The tag proximity waiting time is set in accordance with the selected sheet feed cassette. It is because the path length of the conveyance path 331 from each sheet feed cassette to a position proximity to the wireless tag communication apparatus 201 (hereinafter, referred to as "tag proximity position") is different. As described above, the tag proximity position is for example the vicinity of the resist rollers 31.

For example, as shown in FIG. 1, the path length of the conveyance path 331 from the uppermost sheet feed cassette 161 to the tag proximity position is the shortest and the path length of the conveyance path 331 from the lowermost sheet feed cassette 164 to the tag proximity position is the longest. The tag proximity waiting time is set on the basis of a time required from when the sheet conveyance is started until the sheet is conveyed to the tag proximity position. Therefore for example the tag proximity waiting time set in a case where the sheet feed cassette 161 is selected is a time shorter than the tag proximity waiting time set in a case where the sheet feed cassette 164 is selected.

FIG. 7 is a diagram showing an example of the tag proximity waiting time set in the image forming system according to the first embodiment. FIG. 7 shows the path length (in millimeters), the conveyance speed (in millimeters per second), and the tag proximity waiting time (in seconds) for each sheet feed cassette. As shown in FIG. 7, here, the conveyance speed of the sheet conveyed from each of all the sheet feed cassettes is the same (200 millimeters per second). Therefore, the upper the sheet feed cassette is, the shorter the path length is, so the tag proximity waiting time also becomes shorter.

For example, a tag proximity waiting time Tn_wait of an nth sheet feed cassette is calculated by Expression (1) below.

$$\text{Tn\_wait} = Ln/Vn \tag{1}$$

Here, Ln represents the path length of the conveyance path 331 from an end portion (sheet feed port) from the nth sheet feed cassette to the tag proximity position. Moreover, Vn represents the conveyance speed of the sheet at the time of the nth sheet feed cassette. For example, a tag proximity waiting time T1 wait of the sheet feed cassette 161 is calculated as 0.5 [seconds] using Expression (1).

$$T1\_\text{wait} = L1/V1 = 100/200 = 0.5$$

It should be noted that the tag proximity waiting time may be set, also considering the type of sheet and the orientation. For example, the position and orientation of the wireless tag provided in the sheet can differ depending on the type of sheet and the orientation. In this case, an optimal tag proximity waiting time differs depending on the type of sheet and orientation.

Figure 8:
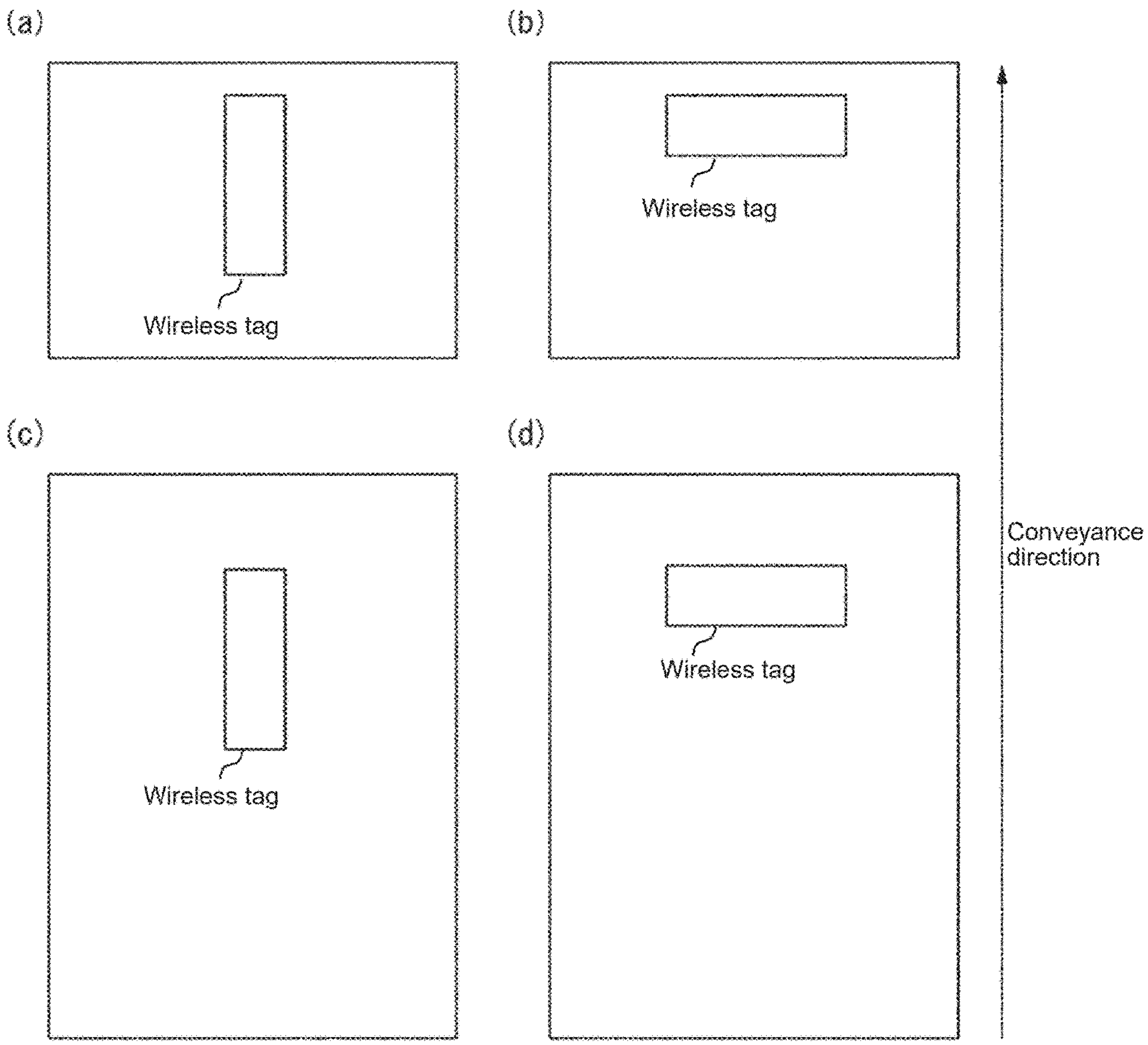
FIG. 8 is a diagram showing an example of the type of sheet.

FIG. 8 is a diagram showing an example of the type of sheet. For example, the orientation of the longitudinal direction of the sheet of (a) is perpendicular to the conveyance direction and the orientation of the wireless tag is parallel to the conveyance direction. The orientation of the longitudinal direction of the sheet of (b) is perpendicular to the conveyance direction and the orientation of the wireless tag is also perpendicular to the conveyance direction. The orientation of the longitudinal direction of the sheet of (c) is parallel to the conveyance direction and the orientation of the wireless tag is also parallel to the conveyance direction. The orientation of the longitudinal direction of the sheet of (d) is parallel to the conveyance direction and the orientation of the wireless tag is perpendicular to the conveyance direction. The optimal tag proximity waiting time differs depending on which one of the sheets of (a) to (d) it is, the tag proximity waiting time may be set also considering the type of sheet and orientation.

It should be noted that a difference in the type of sheet also includes for example a sheet size, a sheet weight per square meter, a wireless tag attachment position, and the like. For example, the weight of the sheet depends on the basis of the sheet size and the sheet weight per square meter and the upper limit of the conveyance speed of the sheet is determined on the basis of the weight. Therefore, it is desirable to set the proximity waiting time in consideration of the type of sheet.

Referring back to FIG. 6, the description will be made. Next, the controller 100 sets the tag proximity waiting time and then starts sheet the conveyance (ACT 104). Next, the controller 100 waits for the set tag proximity waiting time to elapse (ACT 105) and sends a tag writing command to the wireless tag communication apparatus 201 (ACT 106).

The interface 217 of the wireless tag communication apparatus 201 receives the tag writing command sent from the image forming apparatus 10 and outputs the tag writing command to the controller 220 (ACT 201). Next, when the controller 220 acquires the tag writing command, the controller 220 starts wireless tag detection processing (ACT 202).

Next, in a case where the RSSI (received signal strength indicator) of the radio wave (reflection wave) carrying a response signal sent from the wireless tag has exceeded a predetermined threshold (YES in ACT 203), the controller 220 executes the tag writing processing on its wireless tag (ACT 204). Next, when the tag writing processing has been completed, the controller 220 sends the tag writing completion notice to the image forming apparatus 10 via the interface 217 (ACT 205).

In a case where the tag writing completion notice sent from the wireless tag communication apparatus 201 has received (ACT 107), the image forming apparatus 10 executes image forming processing on the sheet to be conveyed (ACT 108). In this manner, the operation of the image forming system shown in the flowchart in FIG. 6 ends.

It should be noted that the processing of transmitting/receiving the tag writing completion notice in ACT 205 and ACT 107 may be omitted.

As described above, in the image forming system according to the first embodiment, the image forming apparatus 10 starts the sheet conveyance, and then waits for the tag proximity waiting time to elapse and sends a tag writing command to the wireless tag communication apparatus 201. With such a configuration, the image forming system according to the first embodiment is capable of executing the tag writing processing after the sheet to be conveyed passes through the no communication area e. Accordingly, the image forming system can increase the success rate of the information writing on the conveyed wireless tag.

Hereinafter, a modified example of the first embodiment will be described.

The image forming system according to the first embodiment described above has the configuration in which the image forming apparatus 10 waits for the tag proximity waiting time to elapse and then sends a tag writing command to the wireless tag communication apparatus 201. That is, in the image forming system according to the first embodiment, the image forming apparatus 10 has the configuration to delay the start timing of the tag writing processing. In contrast, in an image forming system according to the modified example of the first embodiment to be described hereinafter, a wireless tag communication apparatus has the configuration to delay the start timing of the tag writing processing.

It should be noted that in the following description, the image forming apparatus and the wireless tag communication apparatus according to the modified example of the first embodiment will be referred to as "image forming apparatus 10-1" and "wireless tag communication apparatus 201-1," respectively.

Hereinafter, an operation of the image forming system according to the modified example of the first embodiment will be described.

Figure 9:
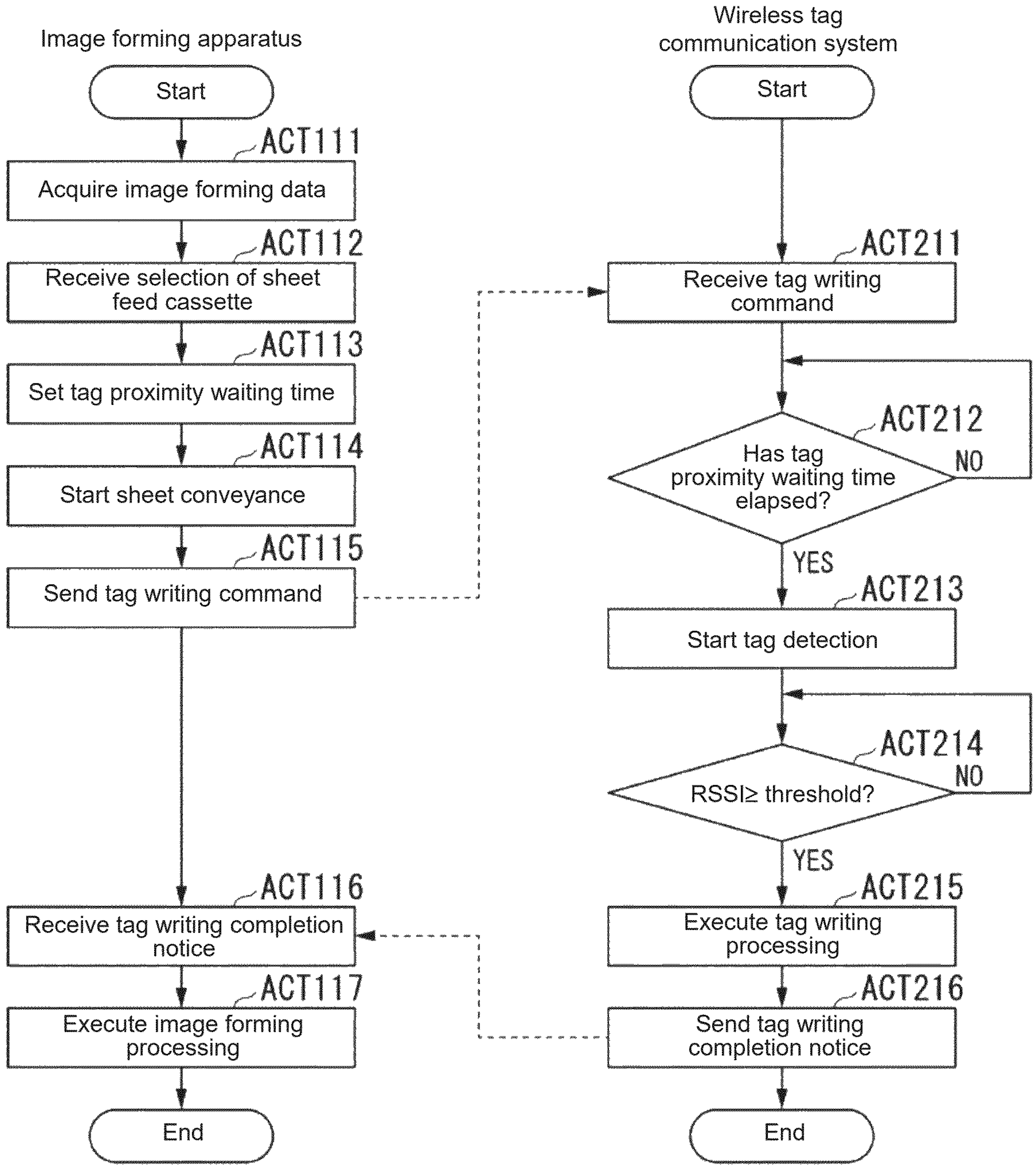
FIG. 9 is a flowchart showing an example of the operation of the image forming system according to the first embodiment.

FIG. 9 is a flowchart showing an example of the operation of the image forming system according to the modified example of the first embodiment. First of all, the printer part 18 of the image forming apparatus 10-1 acquires image forming data stored in the storage device 52 (ACT 111).

Next, the control panel 13 receives an input operation from the user to select the sheet feed cassette to be used and to the controller 100 (ACT 112). The controller 100 acquires the information indicating the selected sheet feed cassette.

Next, the controller 100 sets the tag proximity waiting time on the basis of the selected sheet feed cassette (ACT 113). Next, the controller 100 sets the tag proximity waiting time, and then starts the sheet conveyance (ACT 114). Next, the controller 100 sends to the wireless tag communication apparatus 201 a tag writing command including information indicating the set tag proximity waiting time (ACT 115).

The interface 217 of the wireless tag communication apparatus 201-1 receives the tag writing command sent from the image forming apparatus 10-1 and outputs the tag writing command to the controller 220 (ACT 211). Next, when the controller 220 acquires the tag writing command, the controller 220 waits for the tag proximity waiting time based on the information included in the tag writing command to elapse (ACT 212), and then starts wireless tag detection processing (ACT 213).

Next, in a case where the RSSI (received signal strength indicator) of the radio wave (reflection wave) carrying the response signal sent from the wireless tag has exceeded a predetermined threshold (YES in ACT 214), the controller 220 executes the tag writing processing on the wireless tag (ACT 215). Next, when the tag writing processing has been completed, the controller 220 sends the tag writing completion notice to the image forming apparatus 10-1 via the interface 217 (ACT 216).

In a case where the image forming apparatus 10-1 has received the tag writing completion notice sent from the wireless tag communication apparatus 201-1 (ACT 116), the image forming apparatus 10-1 executes image forming processing on the sheet to be conveyed (ACT 117). In this manner, the operation of the image forming system shown in the flowchart in FIG. 9 ends.

It should be noted that the processing of transmitting/receiving the tag writing completion notice in ACT 216 and ACT 116 may be omitted.

As described above, in the image forming system according to the modified example of the first embodiment, after the wireless tag communication apparatus 201-1 has received the tag writing command, the wireless tag communication apparatus 201-1 waits for the tag proximity waiting time to elapse, and then starts wireless tag detection processing. With such a configuration, the image forming system according to the modified example of the first embodiment is capable of executing the tag writing processing after the sheet to be conveyed passes through the no communication area e. Accordingly, the image forming system can increase the success rate of the information writing on the conveyed wireless tag.

Hereinafter, a second embodiment will be described.

The image forming system according to the modified example of the first embodiment described above, after the wireless tag communication apparatus 201-1 has received the tag writing command has the configuration in which the wireless tag communication apparatus 201-1 waits for the tag proximity waiting time to elapse, and then starts wireless tag detection processing. In contrast, in an image forming system according to the second embodiment to be described hereinafter, after the wireless tag communication apparatus has received the tag writing command and has detected a wireless tag, the wireless tag communication apparatus waits for a predetermined waiting time (hereinafter, referred to as "tag redetection waiting time") to elapse, and then performs "tag redetection processing" of performing the tag detection again. Then, in a case where the wireless tag has been detected again by the tag redetection processing, the wireless tag communication apparatus executes the tag writing processing.

That is, the tag redetection waiting time refers to a predetermined waiting time set between the first detection of a certain wireless tag by the tag detection processing from the executing the tag redetection processing. Setting the tag redetection waiting time allows the tag writing processing to be executed after the sheet to be conveyed passes through the no communication area e. That is, the wireless tag communication apparatus according to the second embodiment has a configuration to detect the wireless tag before passing through the no communication area e by the tag detection processing and detect the wireless tag after passing through the no communication area e by the tag redetection processing again.

It should be noted that in the following description, the image forming apparatus and the wireless tag communication apparatus according to the second embodiment will be referred to as "image forming apparatus 10-2" and "wireless tag communication apparatus 201-2," respectively.

Hereinafter, an operation of the image forming system according to the second embodiment will be described.

Figure 10:
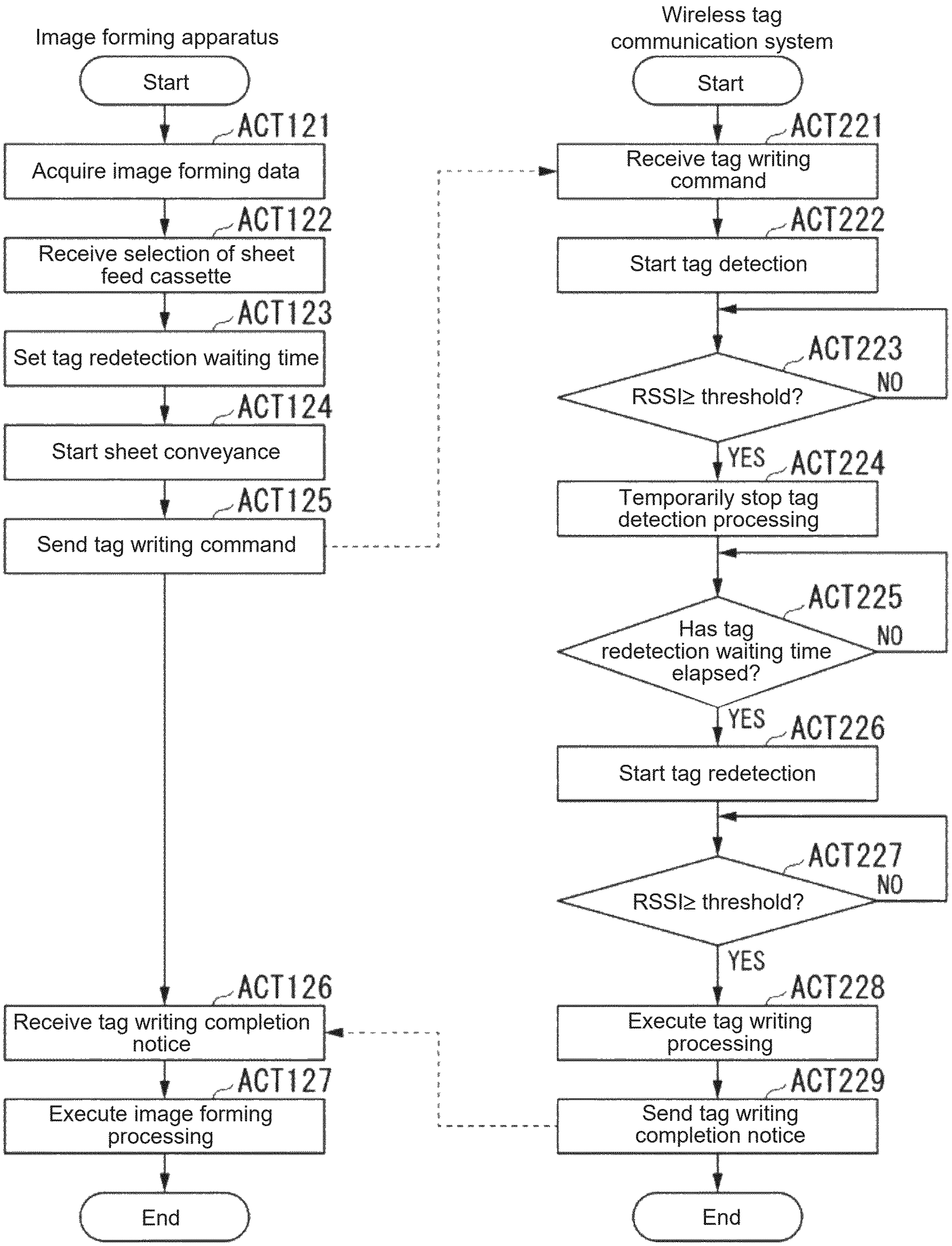
FIG. 10 is a flowchart showing an example of an operation of an image forming system according to a second embodiment.

FIG. 10 is a flowchart showing an example of the operation of the image forming system according to the second embodiment. First of all, the printer part 18 of the image forming apparatus 10-2 acquires image forming data stored in the storage device 52 (ACT 121).

Next, the control panel 13 receives an input operation from the user to select the sheet feed cassette to be used and outputs information indicating the selected sheet feed cassette to the controller 100 (ACT 122). The controller 100 acquires the information indicating the selected sheet feed cassette. Next, the controller 100 sets a tag redetection waiting time on the basis of the selected sheet feed cassette (ACT 123).

The tag redetection waiting time is set in accordance with the selected sheet feed cassette. It is because the path length of the conveyance path 331 from each sheet feed cassette to a tag proximity position is different. As described above, the tag proximity position is for example the vicinity of the resist rollers 31.

FIG. 11 is a diagram showing an example of the tag redetection waiting time set in the image forming system according to the second embodiment. FIG. 11 shows a tag redetection waiting time (in seconds) for each sheet feed cassette.

As shown in FIG. 1, the sheet Sa to be conveyed from the sheet feed cassette 161 does not pass through the no communication area e. Therefore, it is unnecessary to set the tag detection waiting time for the sheet feed cassette 161, so the tag detection waiting time in a case where the sheet feed cassette 161 is used is 0 seconds. Moreover, here, it is assumed that a time Tp required for the wireless tag to pass through the no communication area e is 0.25 seconds (Tp=0.25). Therefore, the tag detection waiting time in a case where the sheet feed cassettes 162 to 164 are used is 0.25 seconds.

It should be noted that the tag redetection waiting time may be set, also considering the type of sheet and orientation. For example, as shown in FIG. 8 described above, the position and orientation of the wireless tag provided in the sheet differs depending on the type of sheet and orientation. In this case, an optimal tag redetection waiting time differs depending on the type of sheet and orientation.

Referring back to FIG. 10, the description will be made. Next, the controller 100 sets a tag redetection waiting time, and then starts the sheet conveyance (ACT 124). Next, the controller 100 sends a tag writing command including information indicating the set tag redetection waiting time to the wireless tag communication apparatus 201-2 (ACT 125).

The interface 217 of the wireless tag communication apparatus 201-2 receives the tag writing command sent from the image forming apparatus 10-2 and outputs the tag writing command to the controller 220 (ACT 221). Next, when the controller 220 acquires the tag writing command, the controller 220 starts wireless tag detection processing (ACT 222). Next, in a case where the RSSI (received signal strength indicator) of the radio wave (reflection wave) carrying the response signal sent from the wireless tag has exceeded a predetermined threshold (YES in ACT 223), the controller 220 temporarily stops the tag detection processing (ACT 224).

Next, the controller 220 waits for the tag redetection waiting time based on the information included in the tag writing command to elapse (ACT 225), and then starts the redetection processing of the wireless tag (ACT 226). Next, in a case where the RSSI (received signal strength indicator) of the radio wave (reflection wave) carrying the response signal sent from the wireless tag has exceeded a predetermined threshold (YES in ACT 227), the controller 220 executes the tag writing processing on the wireless tag (ACT 228). Next, when the tag writing processing has been completed, the controller 220 sends the tag writing completion notice to the image forming apparatus 10-2 via the interface 217 (ACT 229).

In a case where the image forming apparatus 10-2 has received the tag writing completion notice sent from the wireless tag communication apparatus 201-2 (ACT 126), the image forming apparatus 10-2 executes image forming processing on the sheet to be conveyed (ACT 127). In this manner, the operation of the image forming system shown in the flowchart in FIG. 10 ends.

It should be noted that the processing of transmitting/receiving the tag writing completion notice in ACT 229 and ACT 126 may be omitted. In addition, in a case of the second embodiment, configuring the tag detection processing to be constantly performed makes it unnecessary for the wireless tag communication apparatus 201-2 to start the operation using reception of the tag writing command sent from the image forming apparatus 10-2 as a trigger. Therefore, in that case, the processing of transmitting/receiving the tag writing command in ACT 125 and ACT 221 can also be omitted. In a case where the transmission/reception of both the tag writing command and the tag writing completion notice is omitted, it also becomes unnecessary for the image forming apparatus 10-2 and the wireless tag communication apparatus 201-2 to communicate with each other. Accordingly, the wireless tag communication apparatus 201-2 can also be installed as an additional apparatus without changing (modifying) an existing general image forming apparatus.

As described above, in the image forming system according to the second embodiment, after the wireless tag communication apparatus 201-2 has received the tag writing command and has detected the wireless tag, the wireless tag communication apparatus 201-2 waits for the tag redetection waiting time to elapse, and then performs the tag redetection processing. Then, in a case where the wireless tag has been detected again by the tag redetection processing, the wireless tag communication apparatus executes the tag writing processing. With such a configuration, the image forming system according to the second embodiment is capable of executing the tag writing processing after the sheet to be conveyed passes through the no communication area e.

Accordingly, the image forming system can increase the success rate of the information writing on the conveyed wireless tag.

Hereinafter, a third embodiment will be described.

In the image forming system according to the second embodiment described above, after the wireless tag communication apparatus 201-2 has received the tag writing command and has detected the wireless tag, the wireless tag communication apparatus 201-2 waits for the tag redetection waiting time to elapse, and then performs the tag redetection processing. Then, the wireless tag communication apparatus 201-2 has the configuration to execute the tag writing processing in a case where the wireless tag has been detected again by the tag redetection processing. In contrast, in the image forming system according the third embodiment to be described hereinafter, after the wireless tag communication apparatus has received the tag writing command, the wireless tag communication apparatus repeatedly executes the wireless tag detection processing. Then, in a case where the number of times it has detected the same wireless tag has reached a predetermined number of times (hereinafter, referred to as "number of tag detection times"), the wireless tag communication apparatus executes the tag writing processing.

The number of tag detection times is preset to be the number of times that cannot be reached before the sheet to be conveyed passes through the no communication area e. Therefore, setting the threshold of the number of tag detection times allows the tag writing processing to be executed after the sheet to be conveyed passes through the no communication area e.

It should be noted that in the following description, the image forming apparatus and the wireless tag communication apparatus according to the third embodiment will be referred to as "image forming apparatus 10-3" and "wireless tag communication apparatus 201-3," respectively.

Hereinafter, an operation of the image forming system according to the third embodiment will be described.

Figure 12:
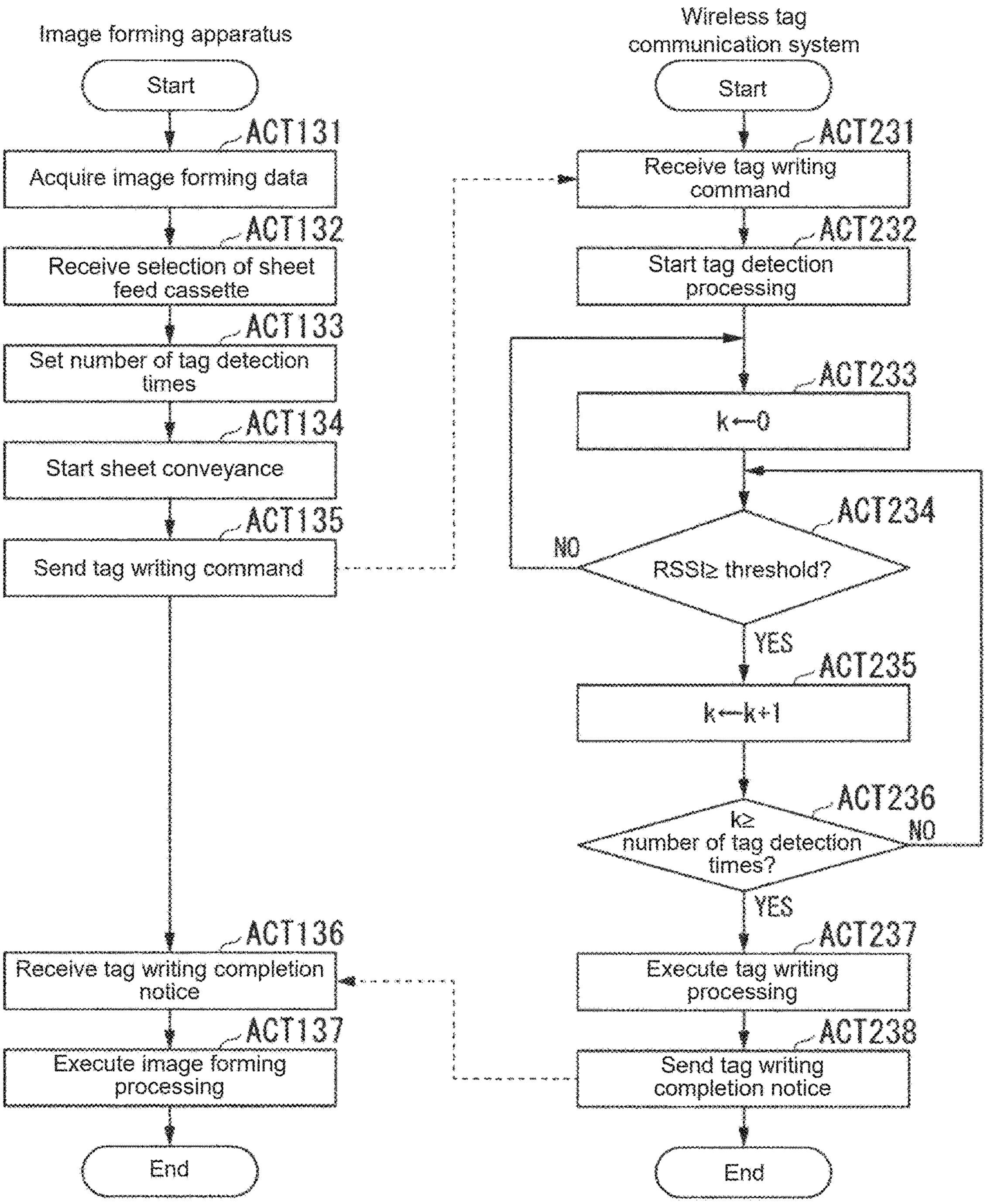
FIG. 12 is a flowchart showing an example of an operation of an image forming system according to a third embodiment.

FIG. 12 is a flowchart showing an example of the operation of the image forming system according to the third embodiment. First of all, the printer part 18 of the image forming apparatus 10-3 acquires the image forming data stored in the storage device 52 (ACT 131).

Next, the control panel 13 receives an input operation from the user to select the sheet feed cassette to be used and to the controller 100 (ACT 132). The controller 100 acquires the information indicating the selected sheet feed cassette. Next, the controller 100 sets the threshold of the number of tag detection times on the basis of the selected sheet feed cassette (ACT 133).

The threshold of the number of tag detection times is set in accordance with the selected sheet feed cassette. It is because the path length of the conveyance path 331 from each sheet feed cassette to the tag proximity position is different. As described above, the tag proximity position is for example the vicinity of the resist rollers 31.

FIG. 13 is a diagram showing an example of the number of tag detection times set by the image forming system according to the third embodiment. FIG. 13 shows the threshold of the number of tag detection times for each sheet feed cassette.

As shown in FIG. 1, the sheet Sa to be conveyed from the sheet feed cassette 161 does not pass through the no communication area e. Therefore, it is unnecessary to set the threshold of the number of tag detection times for the sheet feed cassette 161, so the threshold of the number of tag detection times in a case where the sheet feed cassette 161 is used 0. Moreover, here, it is assumed that the time Tp required for the wireless tag to pass through the no communication area e is 0.25 seconds (Tp=0.25). Moreover, here, it is assumed that a time Td required for single tag detection processing is 0.05 seconds (Td=0.05). Therefore, the threshold of the number of tag detection times in a case where the sheet feed cassettes 162 to 164 are used is 5 (Tp/Td=5).

Referring back to FIG. 12, the description will be made. Next, after the controller 100 sets the threshold of the number of tag detection time, the controller 100 starts the sheet conveyance (ACT 134). Next, the controller 100 sends the tag writing command including the set threshold of the number of tag detection times to the wireless tag communication apparatus 201-3 (ACT 135).

The interface 217 of the wireless tag communication apparatus 201-3 receives the tag writing command sent from the image forming apparatus 10-3 and outputs the tag writing command to the controller 220 (ACT 231). Next, when the controller 220 acquires the tag writing command, the controller 220 starts wireless tag detection processing (ACT 232). Next, the controller 220 performs initialization by substituting 0 for the value of a variable k and causes the storage device 219 to store it (ACT 233). The variable k is a variable used as a counter of the number of times of detecting the wireless tag.

Next, in a case where the RSSI (received signal strength indicator) of the radio wave (reflection wave) carrying the response signal sent from the wireless tag has not exceeded the predetermined threshold (No in ACT 234), the controller 220 returns to the processing in ACT 233 and initializes the value of the variable k again. Moreover, in a case where the RSSI (received signal strength indicator) of the radio wave (reflection wave) carrying the response signal sent from the wireless tag has exceeded a predetermined threshold (Yes in ACT 234), the controller 220 adds 1 to the value of the variable k (ACT 235).

The controller 220 repeats the tag detection processing in ACT 233 to ACT 236 until the value of the variable k reaches the threshold of the number of tag detection times based on the information included in the tag writing command. In a case where the value of the variable k has reached the threshold of the number of tag detection times based on the information included in the tag writing command (Yes in ACT 236), the controller 220 executes the tag writing processing on the wireless tag (ACT 237). Next, when the tag writing processing has been completed, the controller 220 sends the tag writing completion notice to the image forming apparatus 10-3 via the interface 217 (ACT 238).

In a case where the image forming apparatus 10-3 has received the tag writing completion notice sent from the wireless tag communication apparatus 201-3 (ACT 136), the image forming apparatus 10-3 executes image forming processing on the sheet to be conveyed (ACT 137). In this manner, the operation of the image forming system shown in the flowchart in FIG. 12 ends.

It should be noted that the processing of transmitting/receiving the tag writing completion notice in ACT 238 and ACT 136 may be omitted. In addition, as in the second embodiment, in a case of the third embodiment, configuring the tag detection processing to be constantly performed makes it unnecessary for the wireless tag communication apparatus 201-3 to start the operation using reception of the tag writing command sent from the image forming apparatus 10-3 as a trigger. Therefore, in that case, the processing of transmitting/receiving the tag writing command in ACT 135 and ACT 231 can also be omitted. In a case where the transmission/reception of both the tag writing command and the tag writing completion notice is omitted, it also becomes unnecessary for the image forming apparatus 10-3 and the wireless tag communication apparatus 201-3 to communicate with each other. Accordingly, the wireless tag communication apparatus 201-3 can also be installed as an additional apparatus without changing (modifying) an existing general image forming apparatus.

As described above, in the image forming system according to the third embodiment, after the wireless tag communication apparatus 201-3 has received the tag writing command and has detected the wireless tag, the wireless tag communication apparatus 201-3 repeatedly executes the wireless tag detection processing. Then, in a case where the number of times it has detected the same wireless tag has reached the threshold of the predetermined tag the number of detection times, the wireless tag communication apparatus 201-3 executes the tag writing processing. With such a configuration, the image forming system according to the third embodiment is capable of executing the tag writing processing after the sheet to be conveyed passes through the no communication area e. Accordingly, the image forming system can increase the success rate of the information writing on the conveyed wireless tag.

It should be noted that the wireless tag communication apparatus 201, 201-1 to 201-3 may be used, each installed in an apparatus other than the image forming apparatus. That is, the wireless tag communication apparatus 201, 201-1 to 201-3 can be used, installed in any apparatus as long as it is an apparatus with a structure to convey an object provided with the wireless tag.

According to each of the above-mentioned embodiments, the wireless tag communication system includes the conveyance device, the tag communication device, and the controller. For example, the wireless tag communication system is the image forming system according to the embodiment, the conveyance device is the conveyance path 331 according to the embodiment, the tag communication device is the antenna 211 according to the embodiment, and the controller is the controller 220 according to the embodiment. The conveyance device conveys the sheet. The tag communication device performs detection processing of the wireless tag provided in the sheet being conveyed and writing processing of the information on the wireless tag. The controller causes the tag communication device to execute the writing processing after the conveyance device has started to convey the sheet and a predetermined waiting time has elapsed.

It should be noted that in the wireless tag communication system, the predetermined waiting time may be a time from the start of the conveyance to the start of the detection processing. For example, the predetermined waiting time is the tag proximity waiting time according to the embodiment.

It should be noted that in the wireless tag communication system, the predetermined waiting time may be a time from when the wireless tag is detected by the detection processing until the writing processing is started. For example, the predetermined waiting time is a tag redetection waiting time according to the embodiment.

It should be noted that in the wireless tag communication system, the conveyance device may include a plurality of conveyance paths with path lengths different from each other. In this case, the predetermined waiting time is a time determined on the basis of the path length. In this case, the controller causes the writing processing to be executed after the predetermined waiting time corresponding to the conveyance path used for the conveyance elapses.

Moreover, according to each of the above-mentioned embodiments, the wireless tag communication system includes the conveyance device, the tag communication device, and the controller. For example, the wireless tag communication system is the image forming system according to the embodiment, the conveyance device is the conveyance path 331 according to the embodiment, the tag communication device is the antenna 211 according to the embodiment, and the controller is the controller 220 according to the embodiment. The conveyance device conveys the sheet. The tag communication device performs detection processing of the wireless tag provided in the sheet being conveyed and writing processing of the information on the wireless tag. The controller causes the tag communication device to repeatedly execute the detection processing after the conveyance device has started to convey the sheet, and the controller causes the tag communication device to execute the writing processing in a case where the predetermined number of times consecutively the same wireless tag has been detected. For example, the predetermined number of times is the threshold of the number of tag detection times according to the embodiment.

At least some of the functions of the image forming apparatus 10 and the wireless tag communication apparatus 201 according to the embodiment may be realized by a computer. In that case, it may be realized by recording a program for realizing the function on a computer-readable recording medium and causing the computer system to read the program recorded on the recording medium, and executing it. It should be noted that the "computer system" set forth herein includes an OS and hardware such as peripheral equipment. Moreover, the "computer-readable recording medium" refers to a portable medium such as a flexible disk, a magneto-optical disk, a ROM, and a CD-ROM or a storage device such as a hard disk built-in the computer system. In addition, the "computer-readable recording medium" may include one that dynamically retains the program for a short time like a transmission line in a case of sending the program via a network such as the Internet or a communication line such as telephone line or one that retains the program for a certain time like a server in that case or a volatile memory inside a computer system that is a client. Moreover, the above-mentioned program may be one for realizing some of the above-mentioned functions or may be able to be realized by combining the above-mentioned function with the program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication system, comprising:
- a processing apparatus including a conveyance device that conveys a sheet provided with a wireless tag along a conveyance path in a conveyance direction;
- a tag communication device that performs detection processing of the wireless tag of the sheet conveyed by the conveyance device of the processing apparatus and writing processing of information on the wireless tag at a tag writing processing area included in the conveyance path; and
- a controller that causes the tag communication device to execute the writing processing after the conveyance device has started to convey the sheet and a predetermined waiting time has elapsed,
- wherein the conveyance path includes a non-communication area upstream of the tag writing processing area in the conveyance direction, and a wireless communication with the tag communication device for writing processing cannot be performed in the non-communication area.

2. The wireless tag communication system according to claim 1, wherein the predetermined waiting time is a time from when the conveyance is started until the detection processing is started.

3. The wireless tag communication system according to claim 1, wherein
- the predetermined waiting time is a time from when the wireless tag is detected by the detection processing until the writing processing is started.

4. The wireless tag communication system according to claim 1, wherein
- the conveyance path includes a plurality of sub-paths with path lengths different from each other,
- the predetermined waiting time is a time determined on a basis of the path length, and
- the controller causes the tag communication device to execute the writing processing after the predetermined waiting time has elapsed, the predetermined waiting time corresponding to one of the sub-paths used for the conveyance.

5. The wireless tag communication system according to claim 4, wherein
- the predetermined waiting time is a time determined in advance on a basis of at least one of a path length of the one of the sub-paths used for the conveyance, a conveyance speed of the sheet by the conveyance device, an installation position of the wireless tag on the sheet, an installation direction of the wireless tag on the sheet, the conveyance direction of the sheet, or a weight of the sheet.

6. The wireless tag communication system according to claim 1, wherein
- the processing apparatus further includes a resist roller that corrects a tilt of the sheet, and
- the predetermined waiting time is a time determined in advance so that the sheet is located in vicinity of the resist roller at the end of the predetermined waiting time.

7. The wireless tag communication system according to claim 1, wherein
- the tag communication device recognizes that the wireless tag has been detected in a case where a received signal strength indicator of a reflection wave emitted from the wireless tag is equal to or higher than a predetermined threshold.

8. The wireless tag communication system according to claim 1, further comprising:
- a sheet storage from which the sheet is supplied into the conveyance path, wherein the non-communication area is located downstream the sheet storage in the conveyance direction.

9. An image forming apparatus comprising:
- a processing apparatus including a conveyance device that conveys a sheet provided with a wireless tag along a conveyance path in a conveyance direction and forming an image on the sheet; and a wireless tag communication apparatus that communicates with the wireless tag of the sheet, and wherein the wireless tag communication apparatus includes a tag communication device that performs detection processing of the wireless tag of the sheet conveyed by the conveyance device of the processing apparatus and writing processing of information on the wireless tag at a tag writing processing area included in the conveyance path, and a controller that causes the tag communication device to execute the writing processing after the conveyance device has started to convey the sheet and a predetermined waiting time has elapsed, wherein the conveyance path includes a non-communication area upstream of the tag writing processing area in the conveyance direction, and a wireless communication with the tag communication device for writing processing cannot be performed in the non-communication area.

10. The image forming apparatus according to claim 9, further comprising:

a sheet storage from which the sheet is supplied into the conveyance path, wherein the non-communication area is located downstream the sheet storage in the conveyance direction.

11. A wireless tag communication system, comprising:

a processing apparatus including a conveyance device that conveys a sheet provided with a wireless tag;

a tag communication device that performs detection processing of the wireless tag of the sheet conveyed by the conveyance device of the processing apparatus and writing processing of information on the wireless tag; and a controller that causes the tag communication device to repeatedly execute the detection processing after the conveyance device has started to convey the sheet and causes the tag communication device to execute the writing processing in a case where the identical wireless tag has been consecutively detected a predetermined number of times.

12. The wireless tag communication system according to claim 11, wherein the conveyance device has a plurality of conveyance paths with path lengths different from each other, the predetermined number of times is the number of times determined on a basis of the path length, and the controller causes the tag communication device to execute the writing processing in a case where the identical wireless tag has been consecutively detected the predetermined number of times corresponding to the conveyance path used for the conveyance.

13. The wireless tag communication system according to claim 12, wherein the predetermined number of times is the number of times determined in advance on a basis of at least one of a path length of the conveyance path of the conveyance device, a conveyance speed of the sheet by the conveyance device, an installation position of the wireless tag on the sheet, an installation direction of the wireless tag on the sheet, a conveyance direction of the sheet, or a weight of the sheet.

* * * * *